US007921878B2

(12) United States Patent
Coolidge

(10) Patent No.: US 7,921,878 B2
(45) Date of Patent: Apr. 12, 2011

(54) CONTROL VALVE WITH LOAD SENSE SIGNAL CONDITIONING

(75) Inventor: Gregory T. Coolidge, Elyria, OH (US)

(73) Assignee: Parker Hannifin Corporation, Cleveland, OH (US)

( * ) Notice: Subject to any disclaimer, the term of this patent is extended or adjusted under 35 U.S.C. 154(b) by 849 days.

(21) Appl. No.: 11/772,599

(22) Filed: Jul. 2, 2007

(65) Prior Publication Data

US 2008/0000535 A1 Jan. 3, 2008

Related U.S. Application Data

(60) Provisional application No. 60/818,107, filed on Jun. 30, 2006.

(51) Int. Cl.
*F16K 11/07* (2006.01)

(52) U.S. Cl. .............................. 137/625.68; 137/625.69

(58) Field of Classification Search ............. 137/625.66, 137/625.69, 625.68

See application file for complete search history.

(56) References Cited

U.S. PATENT DOCUMENTS 3,200,841 A * 8/1965 Beutler ......................... 137/596
3,881,512 A 5/1975 Wilke
3,929,159 A 12/1975 McAvoy
4,089,169 A 5/1978 Miller
4,099,541 A 7/1978 Binkley et al.
4,413,650 A * 11/1983 Kropp ...................... 137/596.13
5,056,561 A 10/1991 Byers
5,115,835 A 5/1992 Ueno
5,305,789 A 4/1994 Rivolier
5,315,826 A 5/1994 Hirata et al.
5,454,223 A 10/1995 Tschida et al.
5,699,665 A 12/1997 Coolidge
5,832,808 A 11/1998 Ishizaki et al.
5,845,678 A 12/1998 Ishihama et al.
5,957,159 A 9/1999 Takahashi et al.
6,135,149 A 10/2000 Nozawa et al.
6,182,697 B1 2/2001 Parker et al.
6,499,670 B1 12/2002 Brown et al.
6,516,614 B1 2/2003 Knoll
6,871,574 B2 3/2005 Barber
2006/0096645 A1 5/2006 Halvorsen
2006/0137751 A1* 6/2006 Steinhilber et al. ...... 137/625.69

FOREIGN PATENT DOCUMENTS

WO WO 2005/017364 A1 * 2/2005

* cited by examiner

*Primary Examiner* — Craig M Schneider

(74) *Attorney, Agent, or Firm* — Renner, Otto, Boisselle & Sklar, LLP

(57) ABSTRACT

A control valve comprises a valve body having a fluid inlet and at least one work fluid outlet for supplying pressurized fluid to the fluid operated device. A valve member is movable in the valve body in a first direction from a null position to a full flow or open position for supplying flow of pressurized fluid from a feed passage to a work fluid outlet. The valve member has a load sense signal shaping device that provides for initial flow from the feed passage to the work fluid outlet through a metering orifice during movement of the valve member from the null position to the full flow open position so as to shape an initial boost pressure signal.

11 Claims, 6 Drawing Sheets

CONTROL VALVE WITH LOAD SENSE SIGNAL CONDITIONING

RELATED APPLICATION DATA

This application claims the benefit of U.S. Provisional Application No. 60/818,107 filed Jun. 30, 2006, which is hereby incorporated herein by reference in its entirety.

TECHNICAL FIELD

The herein described invention relates generally to control valves and more particularly to directional control valves that can provide a stable and/or manipulable load sense boost signal.

BACKGROUND

Devices such as power shovels, loaders, bulldozers, hydraulic lifts, and the like rely on hydraulic cylinders and motors in order to perform their various functions. The hydraulic cylinders or motors typically are powered by a hydraulic pump, such as a variable displacement pump, which is connected through a directional control valve generally operated directly or indirectly by manually manipulated handles or the like which control flow of hydraulic fluid to the hydraulic cylinders or motors.

Directional control valves heretofore have generally included a valve body having a pressure port which is connected to the pump, tank ports which are connected to a tank or reservoir for hydraulic fluid, and work ports connected to one or more hydraulic cylinders. Operation of the control valve selectively connects various ports with one another in order to control operation of the hydraulic cylinders so that fluid is delivered to the cylinders and exhausted from the cylinders.

A typical fluid control valve has a bore formed in the valve body and a valve spool that can be controllably shifted in the bore by suitable means, such as through fluid actuation, or use of a solenoid(s), mechanical linkage(s), etc. The spool has a plurality of circumferential grooves and the valve body has various ports in communication with the bore via passageways that are selectively connected by positioning the spool axially within the bore.

The directional control valves may be employed in load sensing systems wherein the pump that generates the flow of fluid to the fluid control valve (or valves) delivers that fluid at a variable flow rate and at a variable output pressure based upon the instantaneous requirements of the device controlled by hydraulic cylinder(s)/motor(s) connected to the directional control valve. That is, a load sense signal may be used, for example, to control a variable displacement pump so that displacement volume of the pump can be varied to accommodate varying load conditions. The load sense signal acts as a feedback signal to the pump which is representative of the pressure of the fluid being supplied to the consuming device. Directional control valves that provide such a feedback signal are generally referred to as load sensing valves.

In some load sensing systems, the load sense signal will be at zero or a nominal pressure when the control valve is in a null position. Actuation of the control valve out of its null position will cause pressurized fluid from the pump to be supplied to one of the working ports while allowing for return flow through the other working port. When this occurs, the load sense signal will rapidly increase so as to be indicative of fluid pressure being supplied to the working port and thus the load on the system. In some systems the load sense signal that tracks the pressure supplied to the hydraulic cylinder/motor may be higher than the actual pressure supplied, i.e. maintained at a system margin pressure.

For smoother operation, provision has been made for boosting the load sense signal upon the valve shifting to supply fluid pressure to one of the working ports.

SUMMARY

A problem with the prior art attempts to provide a load sense boost signal has been the sensitivity of such approaches to manufacturing tolerances and/or valve actuation speeds. Slight tolerance variations have been found to have a significant impact on the load sense signal, and such variations are difficult to compensate for especially in the field.

The present invention provides a load sense stabilizer device that can be used to stabilize and/or manipulate the load sense signal. Such an arrangement differs significantly from the prior art attempts to provide a stable and functional load sense signal including, in particular, a load sense boost signal. Sensitivity to tolerance variations can be reduced if not eliminated, and adjustment in the field can be enabled by application of one or more the hereinafter described features.

More particularly, one aspect of the invention provides a control valve for use in a fluid system to control the delivery of pressurized fluid to a fluid operated device. The valve comprises a valve body having a fluid inlet that may be connected to a source of pressurized fluid and at least one work fluid outlet that may be connected to the fluid operated device for supplying pressurized fluid to the fluid operated device. A valve member is movable in the valve body in a first direction from a null position to a full flow or open position for supplying flow of pressurized fluid from a feed passage to a work fluid outlet along a first flow path. The valve member has an output flow metering portion for metering such flow of pressurized fluid from the feed passage to the work fluid outlet as a function of the position of the valve member in the valve body. The valve also comprises a load sense signal shaping device that provides for initial flow from the feed passage to the work fluid outlet through a shaping device flow passage during movement of the valve member from the null position to the full flow open position so as to shape an initial boost pressure signal.

In a particular embodiment, the load sense signal shaping device includes a check valve which preferably is located in the valve member. The check valve may be a poppet valve including an annular valve seat on the valve member and a movable poppet biased toward the valve seat by a spring member interposed between the poppet and an abutment on the valve body. The poppet may have a tapered body extending through the valve seat.

In an alternative embodiment, the load sense signal shaping device may be a metering orifice preferably removably assembled in a passage in the valve member. Provision may be made for adjusting the size of the metering orifice to provide a desired load sense boost signal.

In a particular embodiment, the valve member may be a valve spool movable in a valve bore in the valve body, with the feed passage opening to valve bore at a feed passage opening bounded at one side by a body metering edge. The valve spool may have a spool flow passage opening to an outer surface of the valve spool at a spool opening bounded by a spool metering edge that cooperates with the body metering edge to meter the flow from the feed passage to the spool flow passage when the spool opening overlaps the feed passage opening and also an opening in the valve body communicating with the work fluid outlet. The load sense signal shaping device may have a shaping passage in the spool extending between the spool flow passage and at least one inlet opening at the outer surface of the valve spool at a location forwardly offset from the spool metering edge such that the shaping device inlet will overlap the feed passage opening prior to the spool flow passage.

The spool metering edge may have one or more axially extending metering notches, and the at least one inlet opening of the shaping device passage opens to a respective one of the at least one notches.

The dwell time of the boost pressure may be a function of the axial offset between the inlet opening of the shaping device passage and the spool metering edge. The dwell time of the boost pressure may be a function of the biasing force.

The control valve may also have another load sense signal shaping device associated with the other working port.

According to another aspect of the invention, a method is provided for manufacturing a control valve as above described for use in a fluid system to control the delivery of pressurized fluid to a fluid operated device. The method comprises assembling the control valve and tailoring the boost pressure profile through selection of at least one characteristic of the load sense signal shaping device. The at least one characteristic may include one or more of a spring rate, preload force, and poppet area gain.

Further features of the invention will become apparent from the following detailed description when considered in conjunction with the drawings.

DETAILED DESCRIPTION

Figure 1:
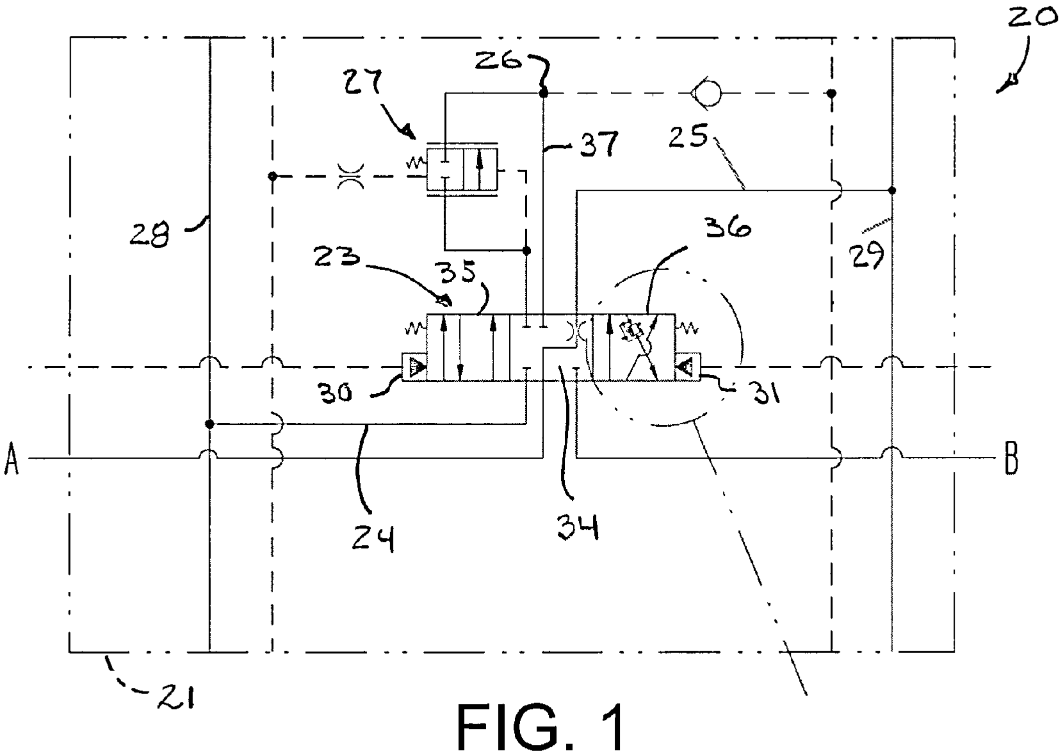
FIG. 1 is a schematic illustration of an exemplary control valve according to the invention.

Referring now in detail to the drawings, FIG. 1 shows a circuit diagram of an exemplary load sensing control valve according to the invention. The control valve 20 generally comprises a housing or valve body 21 having two working fluid outlets (e.g. ports) A and B. The housing contains a direction control member 23 movable to connect a high pressure passage 24 to either one of the fluid outlets and the other to a low pressure return (tank or reservoir) passage 25. The control valve also has a load sense pressure connection 26 through which load sense pressure may be sensed. The load sense signal may be used, for example, to control a variable displacement pump used to supply pressurized fluid to the high pressure passage 24, so that displacement volume of the pump can be varied to accommodate varying load conditions. The load sense signal can be used as a feedback signal to the pump which is representative of the pressure of the fluid being supplied to the consuming device.

The control valve 20 further comprises a compensator 27 for regulating flow upstream of the load sense pressure connection 26. The compensator may be of a conventional type commonly employed in similar directional control valve assemblies.

The control valve 20 may be stacked with other control valves for individually controlling respective fluid operated devices such as, for example, a double-acting hydraulic cylinder. In the case of a double-acting hydraulic cylinder, the working fluid outlets A and B can be connected to the extend and retract sides of the hydraulic cylinder. When valve member 23 is moved to supply pressure fluid via one of the working fluid outlets to one side of the hydraulic cylinder, return flow is directed by the control valve through the other of the fluid outlets to the return line, and vice versa.

The high pressure passages of the stacked control valves may be connected to a common high pressure line 28 for connection to the pump and the return passages may be connected to a common return line 29 for connection to the system tank/reservoir. Similarly, the load sense connections 26 of the control valves may also be connected to provide a combined load sense feedback signal to the pump supplying the pressurized fluid to the control valves. The pump may be a load-sensing variable displacement pressure/flow compensated type. The pump may include a controller which maintains the output through its discharge port at a predetermined fixed pressure value above the pressure in a source return line.

Such load sensing circuits are well known in the art, so a more detailed description is not needed.

The position of the direction control member 23 can be controlled by any suitable means, such as by pressure applied to pilot ports and/or by solenoids. In the control valve shown in FIG. 1, the position of the direction control member is controlled by pressure supplied to pilot ports 30 and 31 that are connected to control circuitry as in a manner well known in the art. The control circuitry may be associated with manually operated controls that may be used to control operation of the a fluid operated device, such as a hydraulic cylinder. The balance of this detailed description will be made in reference to controlling extension and retraction of a hydraulic cylinder for the sake of simplicity in description, although it will be appreciated by the those skilled in the art that other types of fluid operated devices may be controlled.

As illustrated in FIG. 1, the direction control member 23 has a null position 34, a first working position 35 for controllably supplying high pressure fluid to the working fluid outlet A, and a second working position 36 for controllably supplying high pressure fluid from a feed passage 37 to the working fluid outlet B. As thus far described, the direction control member 23 may be of a conventional type for controllably metering flow to the working fluid outlets A and B in response to movement of the direction control member.

Figure 2:
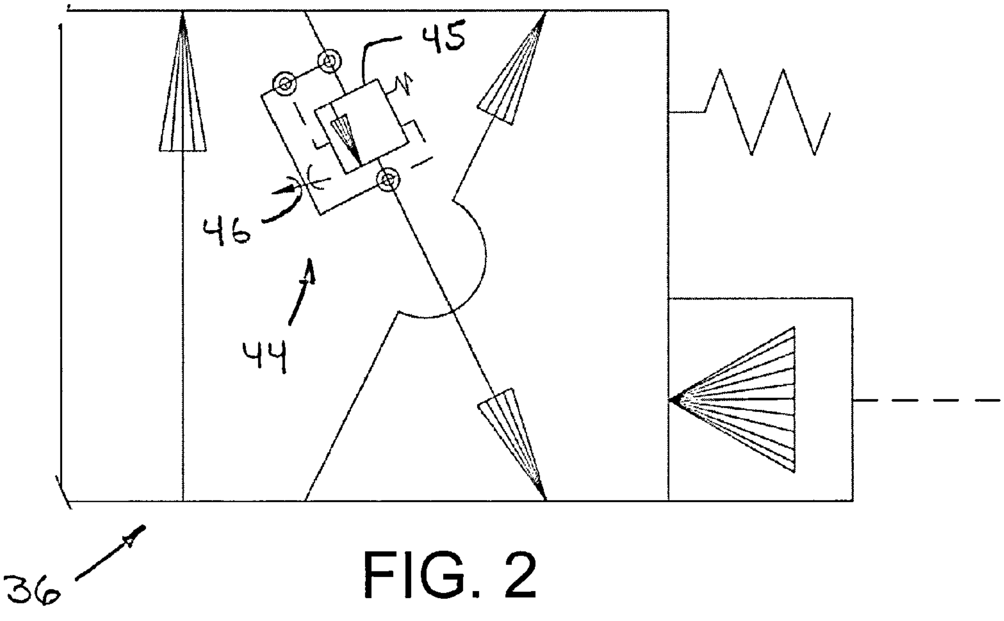
FIG. 2 is an enlarged portion of the schematic illustration of FIG. 1, showing details of an spool position responsive, load sense stabilizer device.

Referring now to FIG. 2, an exemplary application of the principles of the invention to one of the working positions is illustrated in greater detail. As shown, the second working position 36 is provided with a load sense signal shaping device 44 that provides for initial flow from the feed passage to the work fluid outlet through a metering orifice during movement of the valve member from the null position to the full flow or open position so as to shape an initial boost pressure signal at a load sense position upstream of the output flow metering portion of the valve member. In the illustrated embodiment, the load sense signal shaping device includes a check valve 45 which may be located in the direction control member 23. The check valve 45 may be a spring biased poppet valve provided in a bypass flow passage in the direction control member. As the direction control member is shifted out of its null position, a control surface on the direction control member forms a variable orifice 46 for metering flow to the bypass flow passage. That is, pump flow to the check valve is metered by the direction control member.

As the direction control member continues shifting, the check valve will open to direct flow to the working fluid outlet B. Because the check valve 45 and variable orifice 46 will oppose pump flow, a pressure difference will occur between the load sense pressure signal at connection 26 and the pressure at the working fluid outlet B. As will be appreciated by those skilled in the art, modifications to the check valve and the features forming the variable orifice 46 will tailor the pressure difference characteristic, as will be described in greater detail below in respect of a particular implementation of the principles of the invention.

Although herein shown and described in relation to the second working position 36 associated with working fluid outlet B, the first working position 35 alternatively or additionally may be provided with a load sense signal shaping device 44 that provides for initial flow from a feed passage to the work fluid outlet through a metering orifice during movement of the valve member from the null position to the full flow or open position so as to shape an initial boost pressure signal at a load sense position upstream of the output flow metering portion of the valve member.

Figure 3:
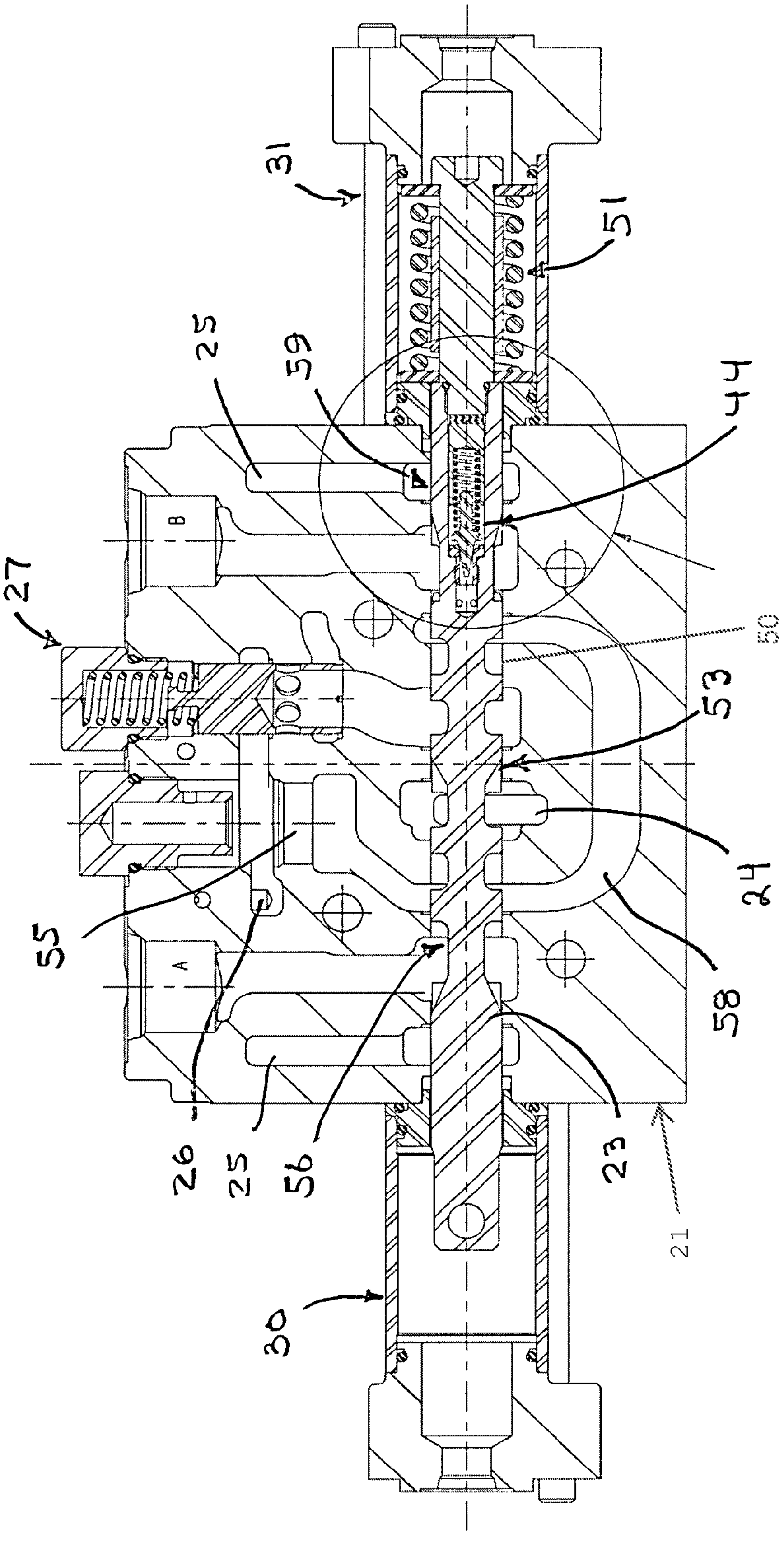
FIG. 3 is a cross-sectional view of an exemplary embodiment of a control valve according to the invention, shown in a null position.

Referring now to FIG. 3, an actual implementation of the control valve 20 is illustrated, and the same reference numerals are used to designate features corresponding to the features of the schematic illustrations of FIGS. 1 and 2. In the FIG. 3 implementation, the direction control member 23 is in the form of a valve spool movable in a valve bore 50 in the valve body 21. The position of the valve spool 23 is controlled via pilot ports 30 and 31, and the valve spool may be biased to its null position by a return spring assembly 51.

Pump flow is supplied to high pressure passage 24. Flow from the high pressure passage is metered by an inlet flow metering section 53 of the spool to a passage provided with the compensator 27. Flow from the compensator passes through a first feed passage 55 to an output flow metering section 56 of the spool that controls the flow to the working fluid outlet A. If the valve is shifted to the left in FIG. 3 for directing flow to working fluid outlet B, flow from the first feed passage 55 is directed by the valve spool to a second feed passage 58 (In FIG. 1 the feed passages 55 and 58 are collectively denoted by reference numeral 37). Flow from the second feed passage 58 is controllably metered by an output flow metering section 59. The valve spool sections 56 and 59 also provide for return of fluid from the opposite working fluid outlet to return flow passages 25.

As thus far described, the control valve 20 shown in FIG. 3 is of a conventional design. As is known in the art, the spool 23 may be provided with various grooves, lands, and associated metering notches in the lands for controlling the flow of fluid between the passages that open to the valve bore. The load sense signal at the location 26 will be influenced by the metering notches on the valve spool 23. Prior art systems also have used a single check valve common to both working fluid outlets for manipulating and/or stabilizing the load sense signal. These prior art arrangements, however, have been sensitive to manufacturing tolerances and/or valve actuation speeds. Slight tolerance variations have been found to have a significant impact on the load sense signal, and such variations are difficult to compensate for especially in the field. Moreover, the load sense signal for each direction of the valve could not be tailored to the specific valve direction to provide optimum manipulation and stabilization of the load sense signal.

The present invention improves on such prior art attempts by providing the load sense signal shaping device 44. Although the load sense signal shaping device is shown associated with the valve spool section 59, a similar load sense signal shaping device may alternatively or additionally associated with the valve spool section 56.

Figure 4:
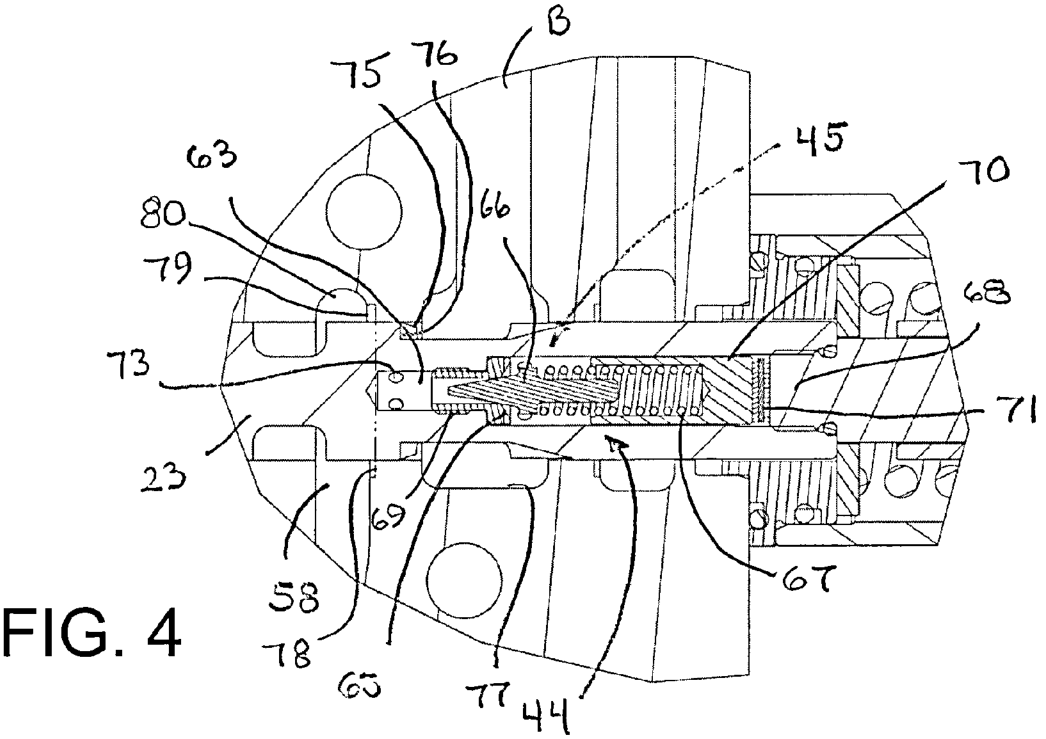
FIG. 4 is an enlarged portion of the control valve, showing an exemplary spool position responsive, load sense stabilizer device.

The load sense signal shaping device 44 is shown in greater detail in FIG. 4. The load sense signal shaping device 44 provides for initial flow from the feed passage 58 to the work fluid outlet B upon shifting of the valve spool to the left in FIG. 4, as discussed further below.

In the illustrated embodiment, the load sense signal shaping device 44 includes the check valve 45 which may be a poppet valve located in a bypass passage 63 in the direction control member 23. The check or poppet valve 45 includes an annular valve seat 65 on the valve spool and a movable poppet 66 biased toward the valve seat by a spring member 67 interposed between the poppet and an abutment 68 on the valve body or otherwise fixed against movement in relation to the valve body. As shown, the poppet may have a tapered body extending through the valve seat, although the poppet may be otherwise configured for a given application. The valve seat may be formed by a tubular insert 69 fixed in the valve spool as shown. The tubular insert may be threaded for threaded receipt in a corresponding threaded portion on interior passage in the valve spool. The insert may have a screwdriver slot or other means in the end face thereof looking to the right in FIG. 4, whereby the insert may be rotated by a tool inserted through an end of the valve spool during assembly of the control valve. An end of the spring member 67, e.g. a coil spring, may be retained in a spring guide 70 that abuts the abutment 68 directly or via one or more shims 71 that may be used to vary the amount of preload acting on the poppet. The amount of preload can be used to tailor the load sense boost signal. In addition, the poppet gain and/or the spring constant of the spring member can be selected to tailor the load sense boost signal. For instance, a higher poppet gain can be provided by increasing the angle of the taper on the portion of the poppet that protrudes through the valve seat.

As seen at the left in FIG. 4, the bypass passage 63 has one or more radial inlet passages 73 that open to the outer surface of the valve spool at respective openings (apertures). These apertures are forwardly offset from primary metering notches 75 provided at a spool metering edge 76 bounding one side of an annular groove 77 in the spool. The annular groove communicates with the working fluid outlet B as well as with the outlet end of the bypass passage 63. The bypass passage apertures and the metering edges will communicate with a body metering edge 78 at surface 79 bounding one side of an annular passage 80 communicating with which the feed passage 58 when the spool is shifted to the left in FIG. 4, but in staggered sequence.

Figure 5:
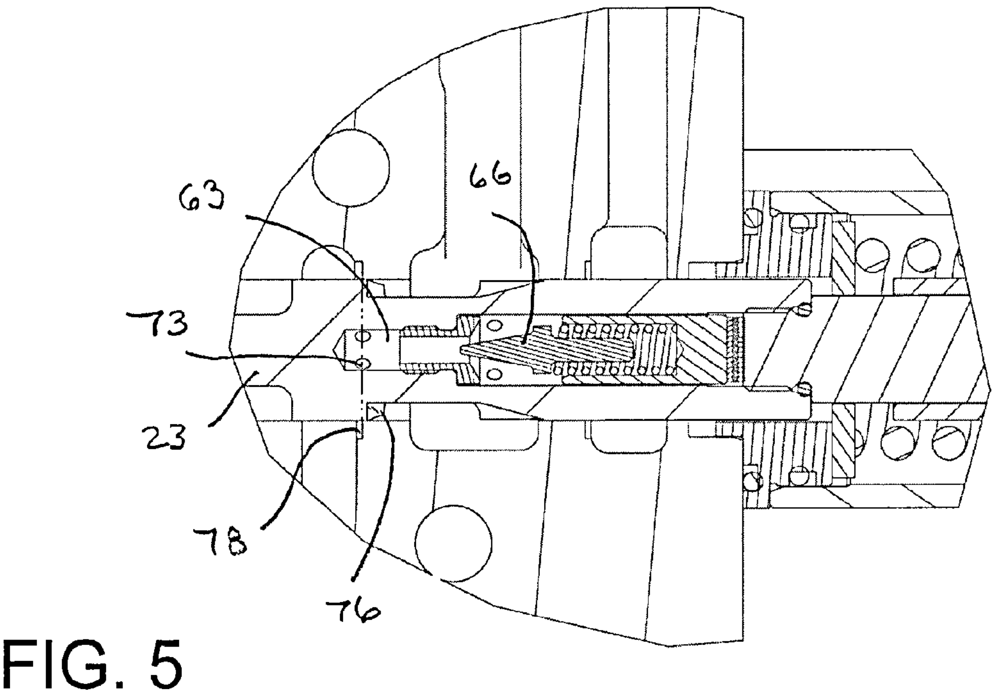
FIG. 5 is a view similar to FIG. 4, but with the valve shifted out of its null position to allow for fluid to be routed to a working port via the load sense stabilizer device.

As seen in FIG. 5, initial shifting of the spool 23 to the left will cause the bypass passage apertures (in radial alignment with the apertures at the inner ends of the passages 73 seen in FIG. 5) to overlap the body metering edge (leading edge denoted by the phantom line) and provide a variable orifice for metered flow of pressure fluid into the bypass passage 63. This flow will cause the poppet to open when the pressure exceeds the biasing force of the spring member, thereby allowing pressure fluid to flow to the working fluid outlet B. As seen in FIG. 5, the spool metering notches have not yet moved to a point where they overlap the body metering edge.

Because the check valve 45 and variable orifice 46 will oppose pump flow, a pressure difference will occur between the load sense pressure signal at connection 26 and the pressure at the working fluid outlet B. Consequently, the load sense pressure will climb above the working fluid pressure at port B and boost the load sense signal. Initially this climb will be steep, and then followed by a period during which the load sense signal continues to increase, but a more gradual rate of ramp up that can be tailored by selecting attributes of the signal shaping device such as the spring preload, spring constant, axial offset between the bypass passage apertures and the spool metering notches, and/or poppet valve gain, as well as the metering notches. That is, the ramp-up period and the rate of ramp-up can be tailored to a desired profile.

Figure 6:
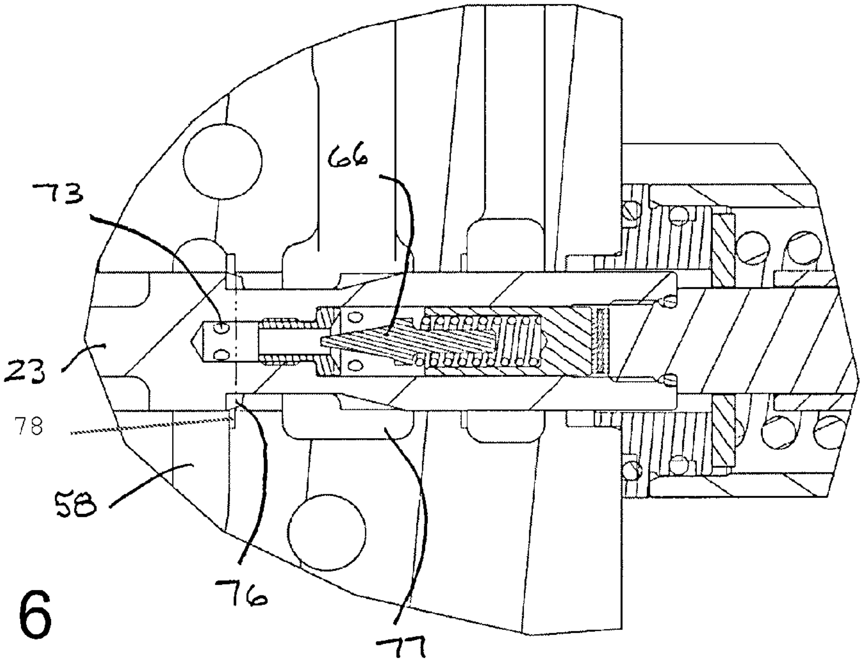
FIG. 6 is a view similar to FIG. 5, but with the valve further shifted to commence primary fluid flow to be routed to a working port as well as flow via the load sense stabilizer device.

After the spool have been further stroked to the left to the position shown in FIG. 6, the spool metering notches 75 will overlap the body metering edge 78 to provide for metered flow directly from the feed passage 58 to the annular groove 77 communicating to the working fluid port B. As the spool continues to shift leftward, the load sense signal boost will then start ramping down. Again, the dwell and ramp-down rate can be varied by selecting attributes of the signal shaping device such as the spring preload, spring constant, axial offset between the bypass passage apertures and the spool metering notches, and/or poppet valve gain, as well as the metering notches.

Figure 7:
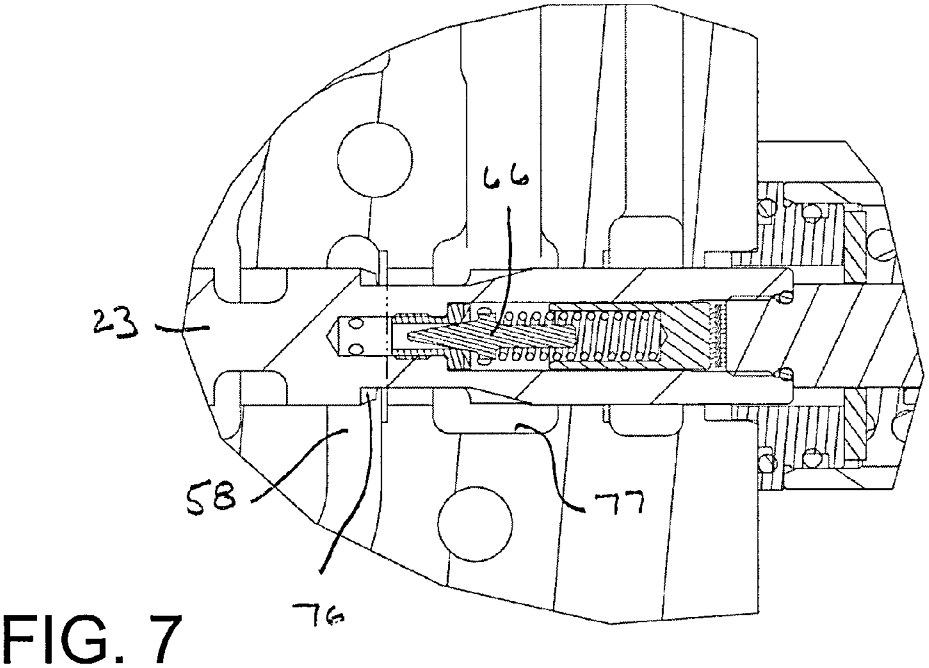
FIG. 7 is a view similar to FIG. 6, but with the valve still further shifted to provide primary fluid flow to working port and no flow via the load sense stabilizer device.

When the spool has shifted to the point in FIG. 7, substantial flow will be directly from the feed passage to the groove 77, whereupon the poppet will have completely closed to close off flow through the bypass passage, which at this point would be of little effect on the load sense signal. At this point the load sense signal will essentially track the working pressure in the working fluid port B as if the load sense signal shaping device was not present.

As will be appreciated, one or more of the attributes of the signal shaping device 44 can be adjusted in the field, such as the spring preload, the spring constant, and/or poppet valve gain by replacing the poppet with another of a different shape. Moreover, the signal shaping device 44 is less sensitive to manufacturing tolerances and valve actuation speed than prior art attempts at providing a load sense boost.

Figure 8:
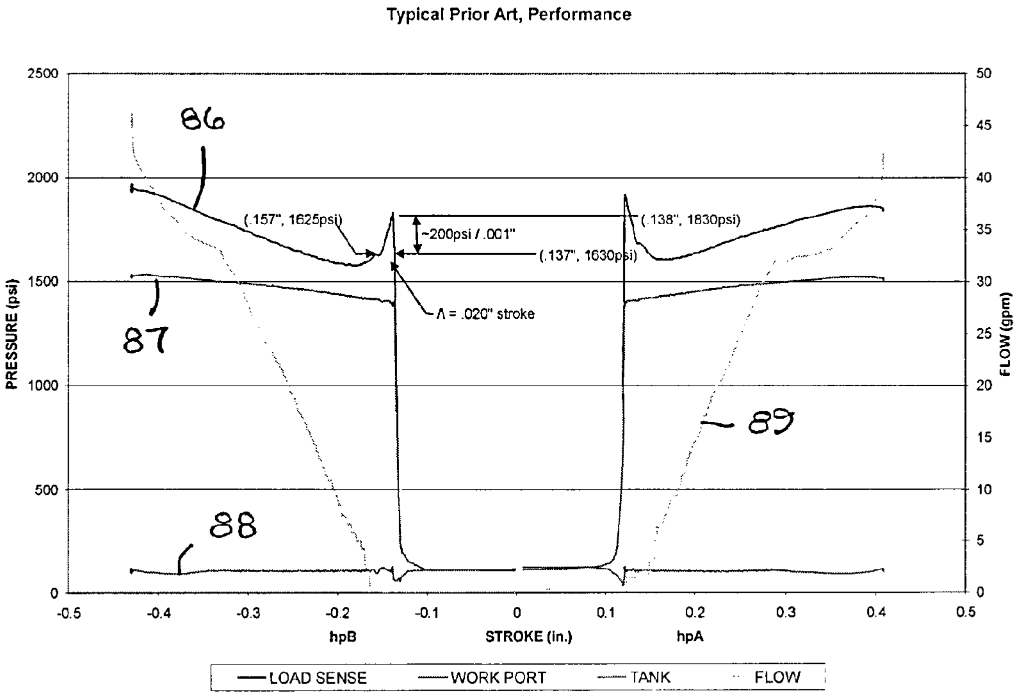
FIG. 8 is a graph showing a load sense signal response of a prior art control valve.

The graph of FIG. 8 exemplifies performance characteristics of a prior art approach to providing a load sense boost. Line 86 is the load sense signal, line 87 is the work port pressure (right side for port A and left side for port B), line 88 is tank pressure, and line 89 is flow. The load sense boost occurs over 0.001 inch stroke with a pressure boost of 200 psi and dwell time of 0.20 inch stroke. These performance characteristics have been inconsistent since they are significantly susceptible to tolerance, as can be seen by comparing the lefthand side to the right-hand side. In addition, the ~200 psi/0.001 characteristic is undesirable since the 0.001 inch stroke occurs before the pressure peak (1830 psi at 0.138 stroke) and then starts to decrease.

Figure 9:
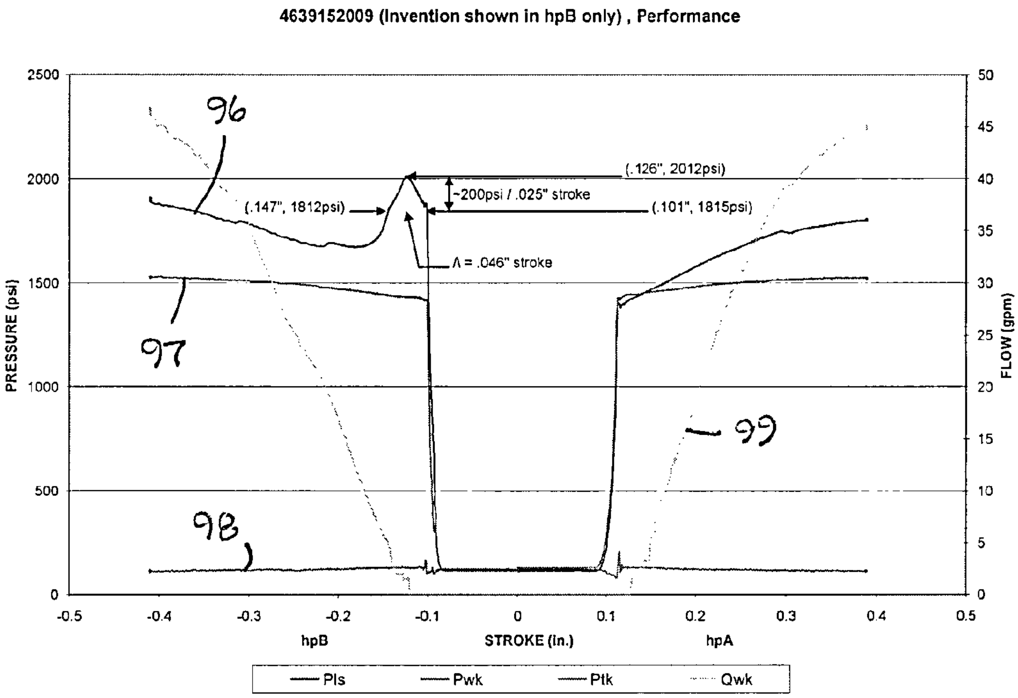
FIG. 9 is a graph showing a load sense signal response of an exemplary control valve according to the invention.

This can be contrasted with FIG. 9 which exemplifies performance characteristics of the control valve shown in FIGS. 3 and 4. In FIG. 9, line 96 is the load sense signal, line 97 is the work port pressure (right side for port A and left side for port B), line 98 is tank pressure, and line 99 is flow. As illustrated, the boost is characterized by ~200 psi/0.025 inch stroke and a dwell of 0.046 inch. The present invention enables these and other desired performance characteristics to be repeatable and relatively unsusceptible to tolerances. The load sense signal can be ramped up more gradually to attain peak pressure (2012 psi) at 0.25 inch stroke and then more gradually ramped down. At the right in FIG. 9, the performance of a conventional valve without load sense boost manipulation is illustrated for comparison purposes.

The pressure characteristic can be thought of as simulated work port load pressure. It is useful because the load sense and therefore inlet pressure can be elevated at the start of metering flow. Higher pressure can be maintained briefly, then gradually reduced relative to the work port load pressure and the point at which it stabilizes. Elevated inlet and load sense pressures can serve to smoothly open inline load holding type devices, manipulate the load sensing flow-compensated source which can create a system margin pressure to a more stable operating position, and overcome a high inertial load. Load sense pressure can respond to work port pressure although it may lag it. Load sense pressure can be higher by virtue of the spring-loaded poppet. As a result, at any moment in time there can be adequate pressure to move the actuator with a high inertial load. This can promote smooth and stable operation.

Figure 10:
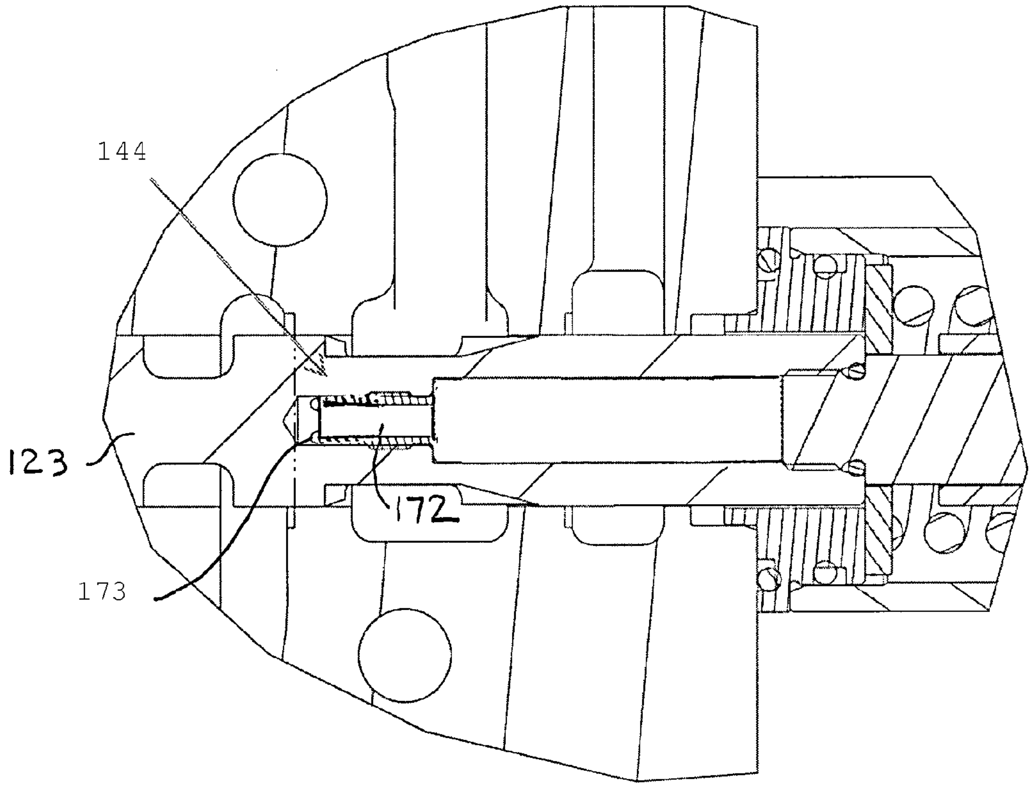
FIG. 10 is a fragmentary cross-sectional view showing an exemplary modified load sense stabilizer device according to the invention.

Referring now to FIG. 10, a modified load sense signal shaping device 144 is illustrated. The device 144 is the same as above described, except that the poppet valve (pressure variable flow restriction) has been replaced by a fixed size flow restriction. In the illustrated embodiment, the radial passage or passages 173 provide the flow restriction, and the effective orifice size thereof may be adjusted as desired by a blocking piece 172 threaded into the valve spool 123 to provide a desired performance characteristic. The blocking piece may be adjusted to vary the extent to which the radially inner ends of the passage 173 are blocked. It should be understood that the illustrated adjustable flow restriction is merely exemplary and that other types can be used. For example, a flow restricting orifice may be provided with a set screw for adjusting the effective orifice size to a desired amount.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of manufacturing a control valve for use in a fluid system to control the delivery of pressurized fluid to a fluid operated device, comprising the steps of:

assembling a control valve that includes:

a control valve body having a fluid inlet that may be connected to a source of pressurized fluid and a first work fluid outlet that may be connected to the fluid operated device for supplying pressurized fluid to the fluid operated device;

a valve member movable in said valve body in a first direction from a null position to a first full flow position for supplying flow of pressurized fluid from a first feed passage to the first work fluid outlet along a first flow path, the valve member having a first output flow metering edge for metering such flow of pressurized fluid through the first flow path as a function of the position of the valve member in the valve body; and a first load sense signal shaping device responsive to the position of the valve member, the first shaping device providing for initial flow from the first feed passage to the first work fluid outlet through a first shaping device flow passage within the valve member during movement of the valve member from the null position to the first full flow position so as to produce an initial boost pressure, the first shaping device flow passage within the valve member being separate from the first flow path and having an upstream end opening to an outer surface of the valve member at a location upstream of the first output flow metering edge and a downstream end portion opening to an outer surface of the valve member at a location downstream of the first output flow metering edge, and wherein a first flow restrictor is disposed in the first shaping device flow passage for producing the initial boost pressure;

and tailoring the boost pressure profile through selection of at least one characteristic of the first load sense signal shaping device.

2. A method as set forth in claim 1, wherein the at least one characteristic includes one or more of a spring rate, preload force, and poppet area gain.

3. A control valve for use in a fluid system to control the delivery of pressurized fluid to a fluid operated device, comprising:

a valve body having a fluid inlet that may be connected to a source of pressurized fluid and a first work fluid outlet that may be connected to the fluid operated device for supplying pressurized fluid to the fluid operated device;

a valve member movable in said valve body in a first direction from a null position to a first full flow position for supplying flow of pressurized fluid from a first feed passage to the first work fluid outlet along a first flow path, the valve member having a first output flow metering edge for metering such flow of pressurized fluid through the first flow path as a function of the position of the valve member in the valve body; and a first load sense signal shaping device for providing for initial flow from the first feed passage to the first work fluid outlet through a first shaping device flow passage within the valve member during movement of the valve member from the null position to the first full flow position so as to produce an initial boost pressure, the first shaping device flow passage within the valve member being separate from the first flow path and having an upstream end opening to an outer surface of the valve member at a location upstream of the first output flow metering edge and a downstream end portion opening to an outer surface of the valve member at a location downstream of the first output flow metering edge, and wherein a first flow restrictor is disposed in the first shaping device flow passage for producing the initial boost pressure.

4. A control valve according to claim 3, wherein a dwell time of the initial boost pressure is a function of the axial offset between the upstream end opening of the shaping device flow passage and the first output flow metering edge.

5. A control valve according to claim 3, wherein the valve member has an inlet flow metering portion for metering flow of pressurized fluid from the fluid inlet to the first feed passage as a function of the position of the valve member in the valve body.

6. A control valve according to claim 3, comprising a pressure compensator between the fluid inlet and the load sense position.

7. A control valve according to claim 3, wherein the valve body includes a second work fluid outlet, the valve member is movable in said valve body in an opposite direction between the null position and a second full flow position for supplying flow of pressurized fluid from a second feed passage to the second fluid work fluid outlet along a second flow path, the valve member having a second output flow metering edge for metering such flow of pressurized fluid through the second flow path as a function of the position of the valve member in the valve body; and a second load sense signal shaping device responsive to the position of the valve member for providing for initial flow from the second feed passage to the second work fluid outlet through a second shaping device flow passage with the valve member during movement of the valve member from the null position to the second full flow position so as to produce an initial boost pressure, the second shaping device flow passage being separate from the first flow path and having an upstream end opening to an outer surface of the valve member at a location upstream of the second output flow metering edge and a downstream end portion opening to an outer surface of the valve member at a location downstream of the second output flow metering edge, and wherein a first flow restrictor is disposed in the second shaping device flow passage for producing the initial boost pressure.

8. A control valve according to claim 3, wherein the first first flow restrictor includes a spring-biased check valve.

9. A control valve according to claim 8, wherein the check valve includes a poppet valve including an annular valve seat on the valve member and a movable poppet biased toward the valve seat by a spring member interposed between the poppet and an abutment on the valve member.

10. A control valve according to claim 9, wherein the poppet has a tapered body extending through the valve seat.

11. A control valve according to claim 10, wherein the poppet and valve seat form therebetween a variable size orifice which varies in size as a function of the pressure difference across the orifice.

* * * * *